United States Patent
Laceky

(10) Patent No.: US 10,827,727 B1
(45) Date of Patent: Nov. 10, 2020

(54) POULTRY FEEDER SYSTEM AND METHOD

(71) Applicant: Kurstin A. Laceky, Georgetown, TX (US)

(72) Inventor: Kurstin A. Laceky, Georgetown, TX (US)

(*) Notice: Subject to any disclaimer, the term of this patent is extended or adjusted under 35 U.S.C. 154(b) by 453 days.

(21) Appl. No.: 15/432,776

(22) Filed: Feb. 14, 2017

Related U.S. Application Data

(60) Provisional application No. 62/295,144, filed on Feb. 14, 2016.

(51) Int. Cl.
| | |
|---|---|
| *A01K 39/01* | (2006.01) |
| *A01K 39/012* | (2006.01) |
| *A01K 39/04* | (2006.01) |
| *A01K 39/014* | (2006.01) |
| *B62B 1/00* | (2006.01) |
| *B62B 5/06* | (2006.01) |

(52) U.S. Cl.
CPC ........ *A01K 39/0125* (2013.01); *A01K 39/014* (2013.01); *A01K 39/04* (2013.01); *B62B 1/008* (2013.01); *B62B 5/06* (2013.01)

(58) Field of Classification Search
CPC ...... A01K 39/00; A01K 39/01; A01K 39/014; A01K 39/0125; A01K 39/04; B62B 1/008; B62B 5/06
See application file for complete search history.

(56) References Cited

U.S. PATENT DOCUMENTS

| | | | |
|---|---|---|---|
| 6,606,966 B1* | 8/2003 | Teachey | A01K 5/0266 119/56.2 |
| 6,701,866 B1* | 3/2004 | Shieh | A01K 5/0291 119/51.11 |
| 6,857,390 B1* | 2/2005 | Maendel | A01K 1/015 111/199 |
| D673,586 S * | 1/2013 | Truan | D15/13 |
| D729,987 S * | 5/2015 | Holm | D30/121 |
| D860,261 S * | 9/2019 | Hsu | D15/13 |
| 2002/0185075 A1* | 12/2002 | Glover | A01K 5/0266 119/57.91 |

(Continued)

OTHER PUBLICATIONS

Olaniyi. (Mar. 2016). A Mobile Intelligent Poultry Feed Dispensing System Using Paticle Swarm Optimized PID Control Technique. Retrieved from ResearchGate: https://www.researchgate.net/publication/303494823_A_Mobile_Intelligent_Poultry_Feed_Dispensing_System_Using_Particle_Swarm_Optimized_PID_Control_Technique.*

*Primary Examiner* — Monica L Barlow
*Assistant Examiner* — Aaron M Rodziwicz
(74) *Attorney, Agent, or Firm* — Johnson & Associates

(57) ABSTRACT

A poultry feeder system and method provides a mobile or movable feeder system which incorporates the functions and features necessary to provide poultry (for example) with essential and/or non-essential food and provisions for living and thriving. The poultry feeder system and method includes a body or (the cart) in which compartments are installed to divide various feeds or to provide storage of feed so the user can store and replenish the feed bins as needed. The feeder system may include wheels and handles, making the feeder system easy to move across terrain so that the user can move the feeder system to various locations in a field or property. The system includes an optional removable scratch spreader system that can be used to throw feed of various types.

20 Claims, 16 Drawing Sheets

(56) References Cited

U.S. PATENT DOCUMENTS

| | | | |
|---|---|---|---|
| 2006/0032450 A1* | 2/2006 | Ginsberg | A01K 5/0225 |
| | | | 119/57.91 |
| 2006/0054722 A1* | 3/2006 | Jones | A01C 17/001 |
| | | | 239/663 |
| 2006/0175779 A1* | 8/2006 | Zak | A47C 13/00 |
| | | | 280/33.998 |
| 2011/0023787 A1* | 2/2011 | Pastoor | A01K 1/0011 |
| | | | 119/51.01 |
| 2013/0092087 A1* | 4/2013 | Bachman | A01K 5/00 |
| | | | 119/51.01 |
| 2013/0127128 A1* | 5/2013 | Meidl | B62B 5/085 |
| | | | 280/47.17 |

\* cited by examiner

POULTRY FEEDER SYSTEM AND METHOD

CROSS-REFERENCE TO RELATED APPLICATION(S)

This application is a conversion of, and claims a benefit of priority under 35 U.S.C. § 119 from U.S. Provisional Application No. 62/295,144, filed Feb. 14, 2016, entitled "POULTRY FEEDER SYSTEM AND METHOD," which is hereby fully incorporated by reference herein.

BACKGROUND

The present invention relates generally to feeders and more specifically it relates to a poultry feeder system and method for providing a mobile or movable feeder system which incorporates the functions and features necessary to provide poultry (for example) with essential and/or non-essential food and provisions for living and thriving.

SUMMARY

The invention generally relates to a feeder which includes a body or (the cart) in which compartments are installed to divide various feeds or to provide storage of feed so the user can store and replenish the feed bins as needed. This method minimizes the hassle of carrying feed from a remote storage location to the feeder system. In some cases, where the feeder system is being used on a large property or field; this distance could be significant, making it difficult or inconvenient to carry the replenishment feed such a long distance.

The feeder system may include wheels making the feeder system easy to move across terrain so that the user can move the feeder system to various locations in a field or property. The system includes handles to make it easy for the user to pick up one end of the feeder and wheel it to another location similar to a wheel barrow.

The system includes an optional scratch spreader system which can be removed if the user does not wish to throw scratch. The scratch spreader system can optionally also be used to throw feed of various types if desired. Therefore, the scratch spreader, scratch hopper, and scratch distribution systems may also be referred to as scratch/feed since this part of the system is flexible to perform either function. The system also includes a lid or cover to protect the internally stored feed or scratch from weather and animals. The lid is designed such that it will cover the internal compartments and/or hopper areas to protect the feed or scratch from ingress of water or other unwanted ingress or access that may damage the feed or the system. The edges of the lid/cover can be made to hang down over the tope surface of the cart body or the hopper such that rain will roll down these edges, past the seams between the opening to the hopper or compartments area and the lid/cover. This is similar to the function of a trash can lid and is a generally well understood part of this system. When the scratch hopper assembly is placed onto the cart, the bottom face of the hopper assembly (where the legs are attached which separate and provide a gap between the spreader plate(s) and the funnel from the hopper) will rest on top of the cart body, thus covering the opening to the compartments and bins. This acts as protection from water ingress similar to the lid or cover. In this configuration the lid/cover will be placed on top of the hopper to protect the internal feed or scratch inside the hopper, from water ingress. Alternatively, the scratch assembly could be designed such that drip edges will hang over the seam between the cart body and the scratch hopper assembly, to further provide protection from water ingress. Another alternative is to use seals such as weather tight stripping or o-ring to create a sealing surface between the hopper assembly and the cart body. Likewise, this same method could be used for the lid/cart.

The system can be made using various materials and shapes. For example, plastic, wood, or metal, or a combination of materials could be used to design the feeder system. The size and shapes of the compartments and bins can be modified by design to accommodate desired amounts of storage or desired amounts of longevity of available feed between required refills by the user.

The same functions of the feeder system could be made into a system that is not moveable, but instead is fix mountable for example to a fence or to a post or inside a coop. Additional features could be added to the system for use in the field or in the fixed location variations described. For example, the system could be adapted to add water dispenser(s). There are many water dispensers available which could be added to the cart assembly or an internal compartment(s) could be converted to store and dispense water in a similar way to already commercially available water dispensers for poultry. Furthermore, water hose bibs and faucets could be added onto the system (especially for fixed location variants of the system) to make water replenishment convenient or even automatic by use of a float switch type mechanism to cut off water flow when the dispenser is full (only as an example). Finally, another variant to the feed system for field use, especially for the movable version of the feeder system, would be to add a rain collection system or tray which would capture rain water and collect it into a dispenser where the poultry could then access the water at will. Again, this could be added separately outside of the feeder system or internal to the feeder system within a compartment or compartments. Such a rain collection system could further increase the convenience for the user and increase the overall self-sustaining nature of the feeder system.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a poultry feeder system and method for providing a mobile or movable feeder system which incorporates the functions and features necessary to provide poultry (for example) with essential and/or non-essential food and provisions for living and thriving.

Another object is to provide a Poultry Feeder System And Method that makes it easy for a person to provide, store, and replenish various items such as food, grit, oyster shell (for calcium), etc . . . for purpose of examples, this may be needed or desired when raising and maintaining chickens or other poultry. The feeder system is able to store and dispense a variety of these items all at the same time while keeping the items separate from each other in compartments or bins.

Each bin is appropriately designed, sized, and shaped to provide ideal storage, dispensing, and/or accessibility to the item by the poultry. The size of the wheels and the distance from the ground to the open areas in which the poultry will eat from, is designed such that the distance keeps the feed in reach for both young and full grown poultry while also keeping the feed bin openings far enough from the ground level to prevent water intrusion and splashing of dirt and mud into the feed. The feeder system and its related dimensions can be scaled to ideally accommodate specific types of poultry and their specific sizes, heights, and feeding requirements. The details on how this is done will become evident in the following figures and descriptions within this application.

Another object is to provide a Poultry Feeder System And Method that makes it easy for the user to store and replenish these items such that the items are readily available for the poultry with minimal or no need for human interaction or manipulation to make the items available. In other words, the feeder system is a convenient and self-sustaining invention that allows the poultry to also be self-sustaining with minimal maintenance or work required of the person raising or maintaining the poultry. The feeder system provides bins for storing feed, vegetables, or many other items such that the poultry can freely feed on these items at will. The feeder system can be scaled in size to store and make feed available to the poultry for various amounts of time between required refills by the user depending on how many animals are being fed or maintained.

Another object is to provide a Poultry Feeder System And Method that is easily movable. Some people prefer to let poultry free-range instead of living in a coop. The subject feeder system can be made mobile such that the user can periodically move the feeder system to different areas of a property. This can be advantageous to allow the poultry to scratch and feed on new or replenished areas of land. It can also help to preserve or maintain the quality or health of the land itself by not having continuous use of a specific area of land by the poultry. This can allow grass or other vegetation to recover or re-grow. It can also allow bugs and other natural food sources to recover or return to the area after previously being diminished by the poultry. Of course the feeder system could also be used within a stationary coop as a feeder system providing all of the same benefits but without being mobile. Likewise, the feeder system could be used in conjunction with a coop where the coop and the feeder system can be moved together. There are some advantages in this because a coop can offer protection from predators such as hawks, raccoons, and fox that otherwise may have easier access to the poultry if the poultry were free-ranging.

Another object is to provide a Poultry Feeder System And Method that allows a user to optionally dispense items such as "scratch" which is more like candy to poultry such as chicken. The feeder system can be made to provide an automatic spreading or dispensing method to throw the scratch in a larger area around the feeder system. This serves a purpose to keep the poultry in the area around the feeder and encourages their natural scratching and feeding behavior to pick up the scratch from the ground. Because scratch is non-essential, many people prefer to limit the amount of scratch provided to the poultry. This feeder system will describe the use of a timer system, motor, and distribution plate which used in conjunction can be programmed or designed to distribute scratch or other feed at pre-determined times, intervals, and/or pre-determined amounts at the mentioned times and intervals. The feeder system provides a method which allows a user to easily and quickly install or remove the scratch feeder portion of the system depending on whether the user wants to distribute scratch or prefers not to provide scratch.

Another object is to provide a Poultry Feeder System And Method that allows for easy cleaning of the storage and dispensing areas of the feeder system. For example, this document will describe the use of a removable compartment(s) and/or baffles so as to make it easier for the user to clean otherwise difficult to reach areas of the feeder such as internal corners of the feed bins.

Another object is to provide a Poultry Feeder System And Method that provides weather resistance to protect the feed from being ruined by rain for example.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
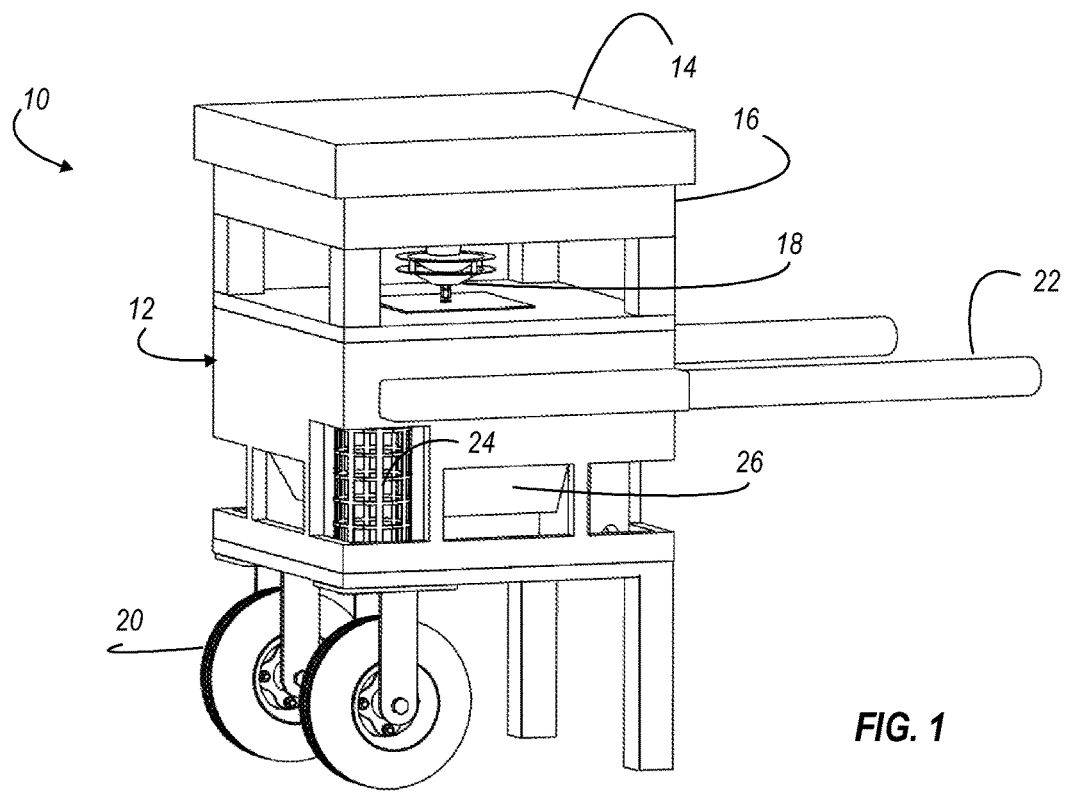
FIG. 1 is a left side view of one embodiment of a feeder system.

Turning now descriptively to the drawings, in which similar reference characters denote similar elements throughout the several views, the figures (described in more detail below) illustrate a body or (the cart) in which compartments are installed to divide various feeds or to provide storage of feed so the user can store and replenish the feed bins as needed. This method minimizes the hassle of carrying feed from a remote storage location to the feeder system. In some cases where the feeder system is being used on a large property or field; this distance could be significant, making it difficult or inconvenient to carry the replenishment feed such a long distance.

The feeder system includes wheels making the feeder system easy to move across terrain so that the user can move the feeder system to various locations in a field or property. The system includes handles to make it easy for the user to pick up one end of the feeder and wheel it to another location similar to a wheel barrow.

The system includes an optional scratch spreader system which can be removed if the user does not wish to throw scratch. The scratch spreader system can optionally also be used to throw feed of various types if desired. Therefore, the scratch spreader, scratch hopper, and scratch distribution systems may also be referred to as scratch/feed since this part of the system is flexible to perform either function.

The system also includes a lid or cover to protect the internally stored feed or scratch from weather and animals. The lid is designed such that it will cover the internal compartments and/or hopper areas to protect the feed or scratch from ingress of water or other unwanted ingress or access that may damage the feed or the system. The edges of the lid/cover can be made to hang down over the top surface of the cart body or the hopper such that rain will roll down these edges, past the seams between the opening to the hopper or compartments area and the lid/cover. This is similar to the function of a trash can lid and is a generally well understood part of this system.

When the scratch hopper assembly is placed onto the cart, the bottom face of the hopper assembly (where the legs are attached which separate and provide a gap between the spreader plate(s) and the funnel from the hopper) will rest on top of the cart body, thus covering the opening to the compartments and bins. This acts as protection from water ingress similar to the lid or cover. In this configuration the lid/cover will be placed on top of the hopper to protect the internal feed or scratch inside the hopper, from water ingress. Alternatively, the scratch assembly could be designed such that drip edges will hang over the seam between the cart body and the scratch hopper assembly, to further provide protection from water ingress. Another alternative is to use seals such as weather tight stripping or o-ring to create a sealing surface between the hopper assembly and the cart body. Likewise, this same method could be used for the lid/cart.

The system can be made using various materials and shapes. For example, plastic, wood, or metal, or a combination of materials could be used to design the feeder system. The size and shapes of the compartments and bins can be modified by design to accommodate desired amounts of storage or desired amounts of longevity of available feed between required refills by the user.

The same functions of the feeder system could be made into a system that is not moveable, but instead is fix mountable for example to a fence or to a post or inside a coop. Additional features could be added to the system for use in the field or in the fixed location variations described. For example, the system could be adapted to add water dispenser(s). There are many water dispensers available which could be added to the cart assembly or an internal compartment(s) could be converted to store and dispense water in a similar way to already commercially available water dispensers for poultry. Furthermore, water hose bibs and faucets could be added onto the system (especially for fixed location variants of the system) to make water replenishment convenient or even automatic by use of a float switch type mechanism to cut off water flow when the dispenser is full (only as an example). Finally, another variant to the feed system for field use, especially for the movable version of the feeder system, would be to add a rain collection system or tray which would capture rain water and collect it into a dispenser where the poultry could then access the water at will. Again, this could be added separately outside of the feeder system or internal to the feeder system within a compartment or compartments. Such a rain collection system could further increase the convenience for the user and increase the overall self-sustaining nature of the feeder system.

Referring now to the drawings, FIG. 1 is a left side view of one embodiment of a feeder system. This drawing illustrates a feeder system 10 having a feeder system body 12 (i.e., a main cart body, a cart, etc.), including various elements of the feeder system, such a lid 14, scratch feeder hopper 16, the scratch spreader assembly 18, the storage bins/compartments, optional wheels 20 and handles 22, the vegetable cages 24, and baffles 24 for feed and grit bins. Numerous other combinations are also possible.

Figure 2:
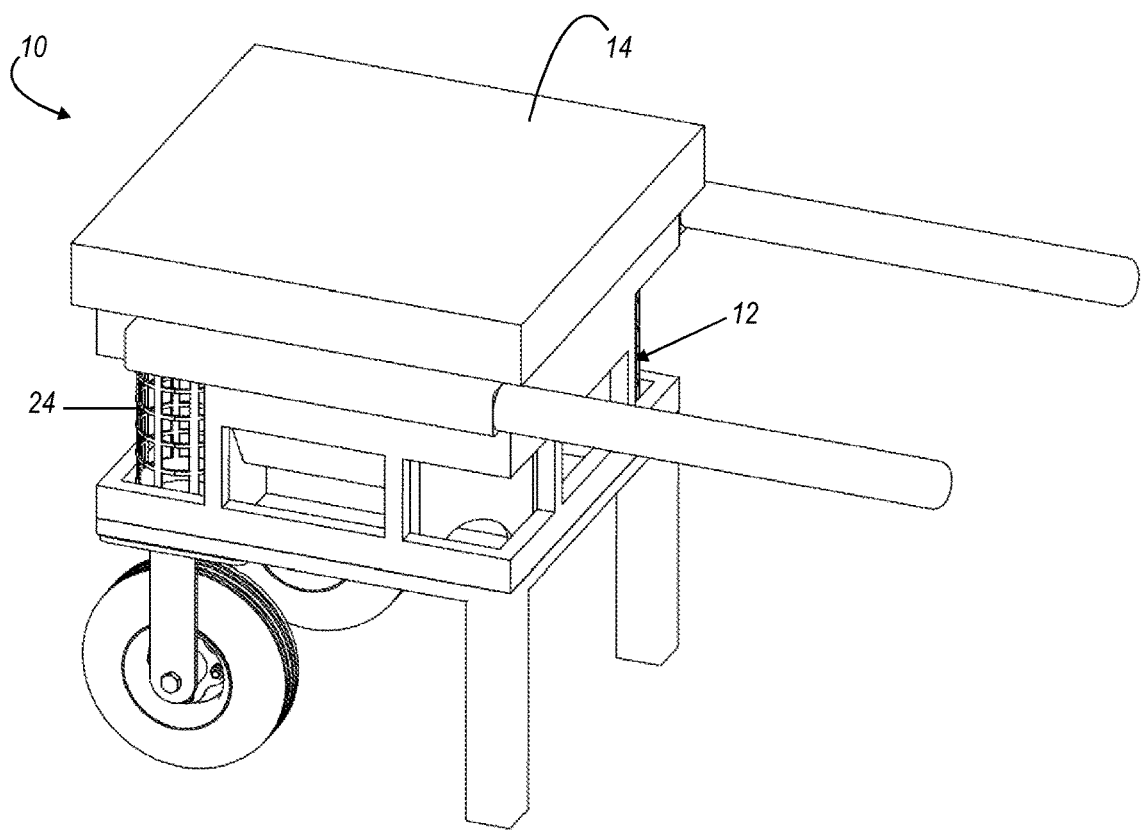
FIG. 2 is a left side view of one embodiment of a feeder system.

FIG. 2 is a left side view of the feeder system 10. This drawing illustrates the feeder system 10 without the optional scratch feeder portion. The scratch hopper and the scratch spreader assemblies are removed from the feeder system in this configuration and the lid 14 or cover is simply placed on top of the main body or cart 12 to protect the internally stored feed. This illustrates the multi-functionality of the feeder system 10 and how easily the user can change from basic feeder without scratch then easily add the scratch feeder components if the user wants to throw scratch for the poultry.

Figure 3A:
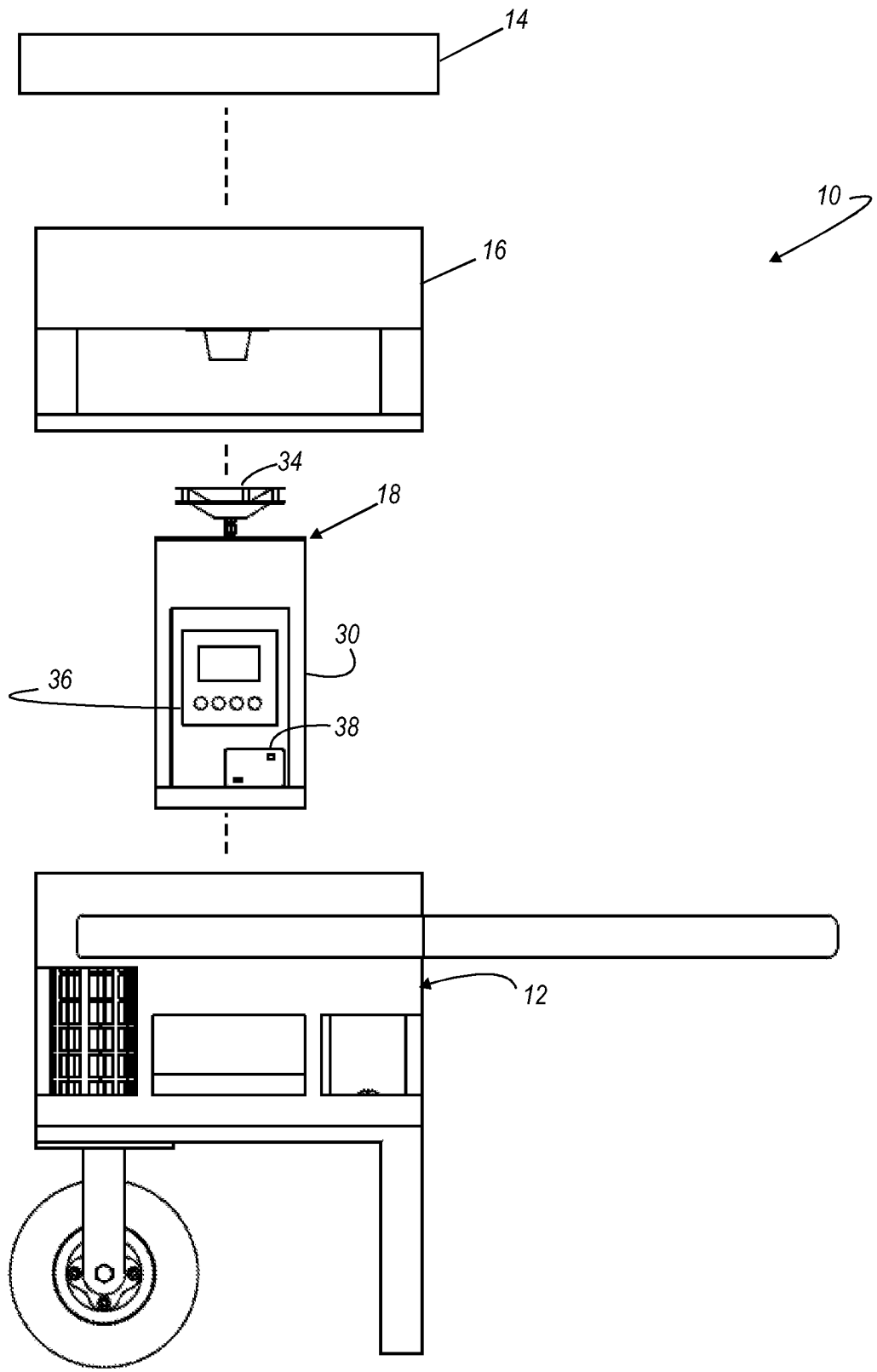
FIGS. 3A-3C are exploded isometric views of a feeder system.
Figure 3B:
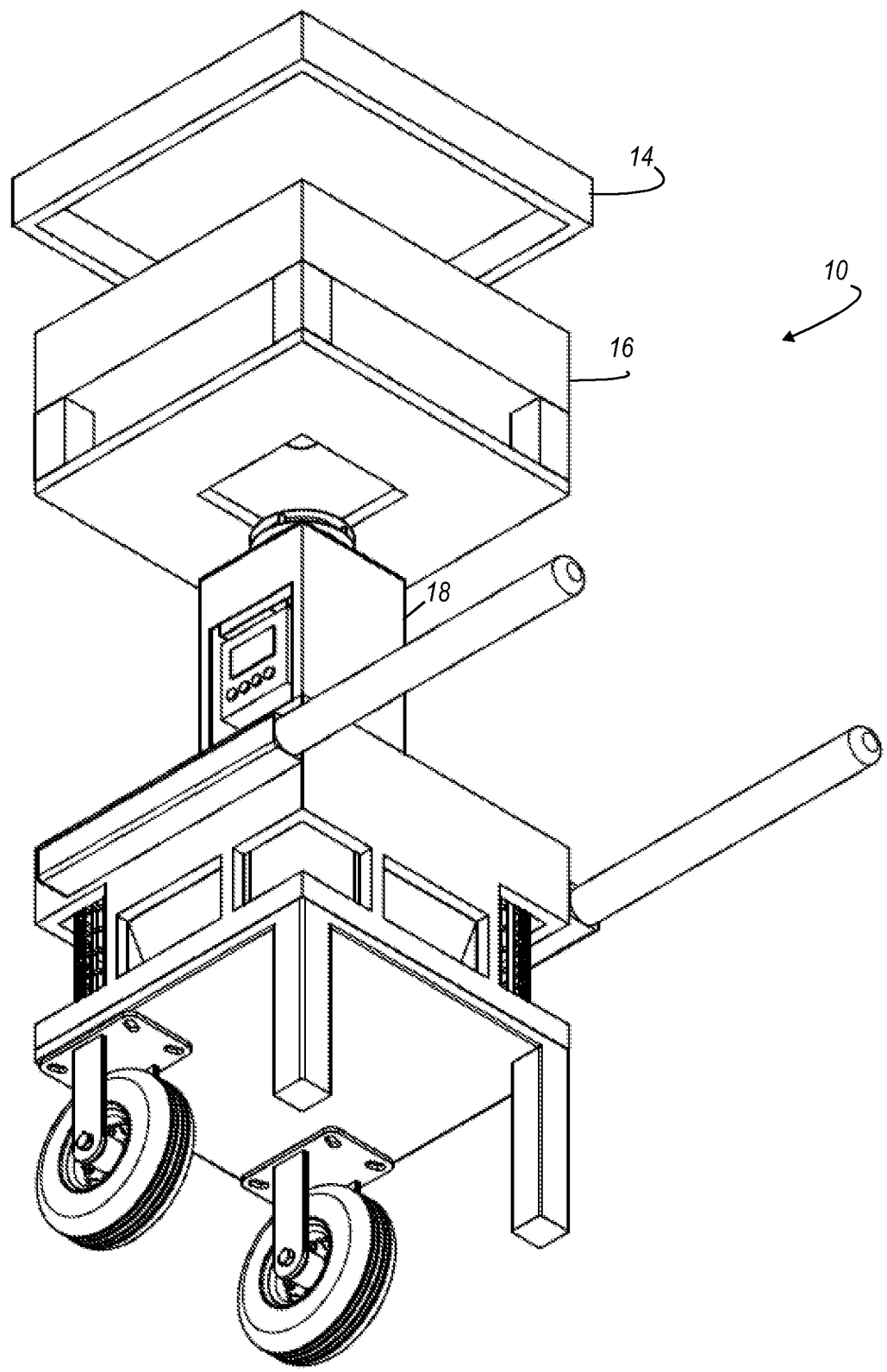
Figure 3C:
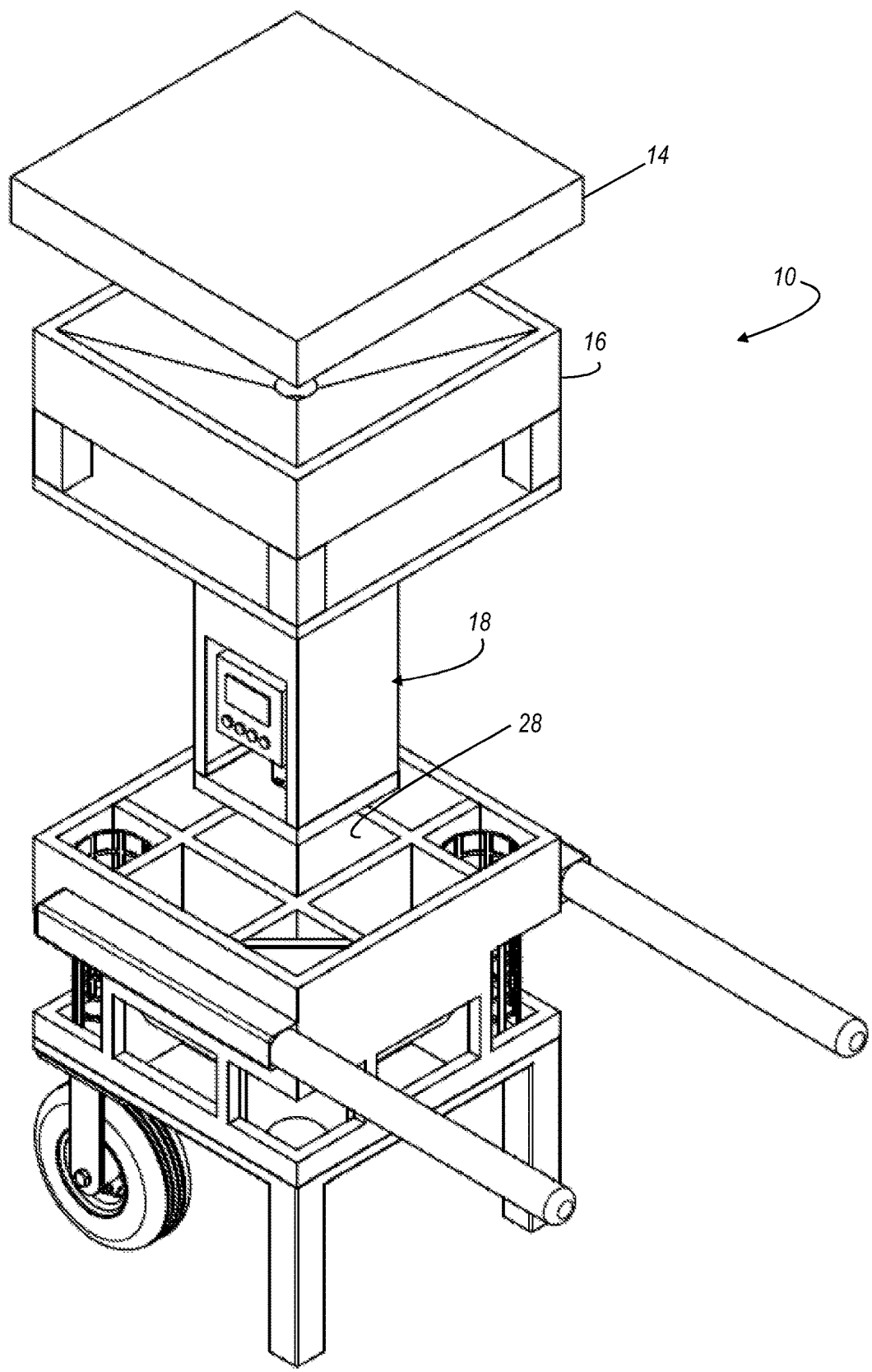

FIGS. 3A-3C are exploded sets of views of a feeder system. This figure provides exploded views to show how the main components of the feeder system go together. You can see the scratch spreader mechanism or assembly 18 is inserted into one of the internal compartments (for example, compartment 28 shown best in FIG. 3C) of the main body of the cart assembly 12. This makes it convenient for the user to install or remove the scratch spreader mechanism 18 depending on whether the user wants to throw scratch or not. The spreader assembly includes an enclosure 30 for holding a motor (e.g., motor 32 shown in FIG. 10B) which is mechanically attached to a spreader plate assembly 34 which distributes the scratch or feed when the motor spins. The feed or scratch falls onto the spreader plate 34 by gravity from the scratch feeder assembly which acts as a hopper 16 to hold the scratch or feed. The feed or scratch collects towards the center of the hopper 16 by use of sloped walls or a built in funnel inside the hopper (e.g., see FIG. 10B). This ensures that feed or scratch will not simply sit in the hopper and ensures that the feed will fall onto the distribution plate 34 via gravity. The scratch or feed falls through a hole in the hopper 16 and through a funnel onto the spreader plate 34. Again, when the motor 32 turns, the plate spins and centripetal forces distribute the scratch or feed outwards from the scratch feeder assembly 18. This assembly is designed to have open areas that will allow the feed or scratch to be slung outwards in a radius around the feeder system 10, proving a large area of ground for poultry to scratch and feed. This is advantageous compared to simply dropping scratch or feed straight down into a single location because poultry naturally scratch and peck over a larger area. The motor 32 is activated by a timer 36 (also shown in the scratch spreader assembly). The timer 36 can be set by the user to throw at various pre-determined time and intervals and durations. The timer 36 and motor 32 are powered by a battery 38 which is also shown inside the scratch spreader assembly or mechanism.

Figure 4:
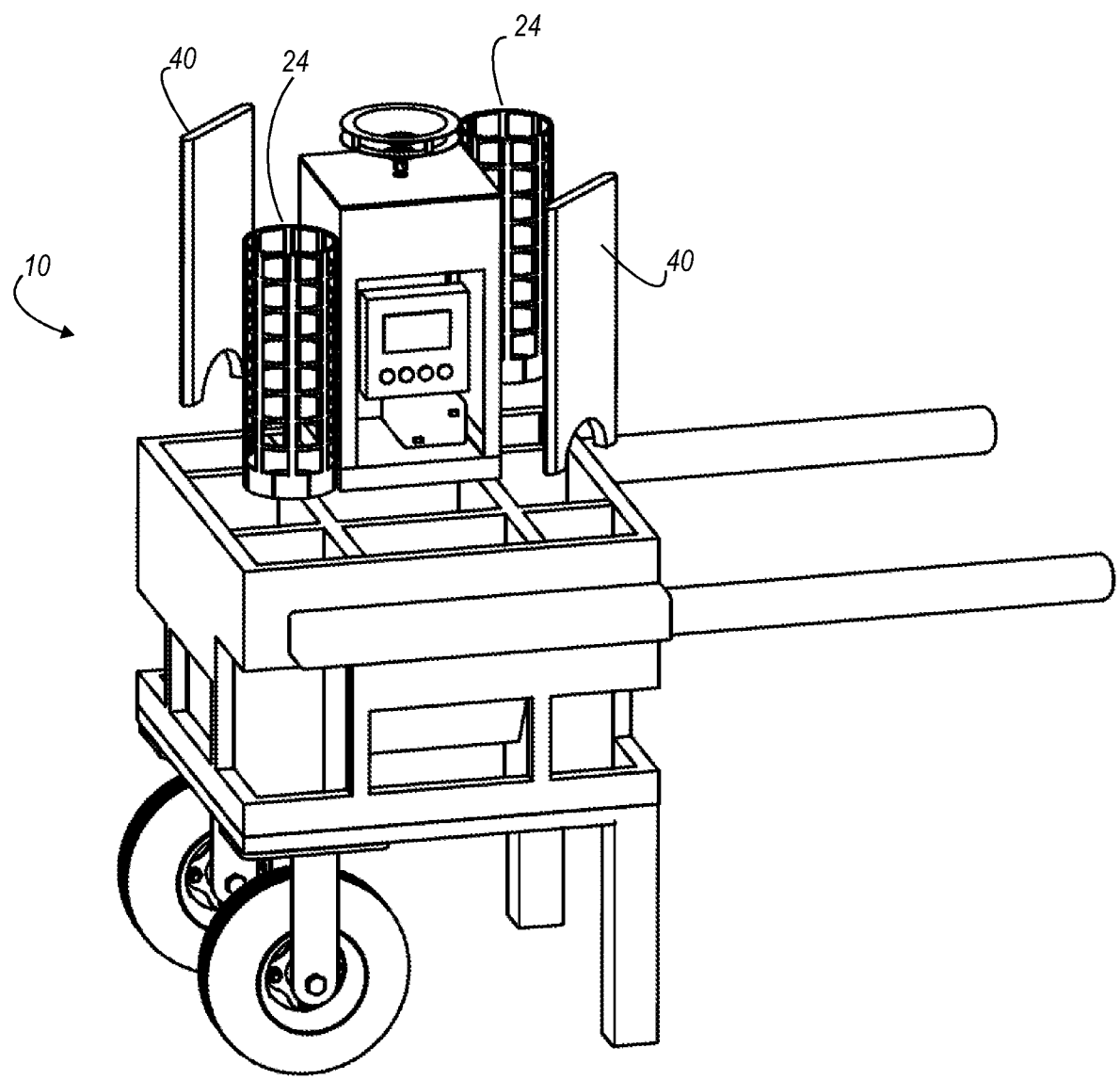
FIG. 4 is an exploded side view of one embodiment of a feeder system.

FIG. 4 is an exploded side view of one embodiment of a feeder system 10. This view shows how the scratch/feed spreader mechanism 18 with motor and timer built in, is inserted into the cart compartment. Also illustrated is how the vegetable cages 24 and feed bin baffles 40 are slid into place inside the appropriate compartments. The vegetable cages 24 allow the user to put items such as broccoli or lettuce into the cage. The poultry can peck the items through the cage but cannot pull the whole item out of the cage. The baffles 40 shown are used to slide in to place on the two corners which are allocated for oyster or grit. These items promote healthy production of egg shell and also the grit is needed by some poultry to grind and process their food. The baffles 40 slide into place as shown in the figures of this application (e.g., FIG. 7). The baffles 40 include a small "mouse hole" or equivalent feature such that the grit or oyster shell can be poured into the bin behind the baffle 40 and gravity will allow the item to flow out of the small mouse hole and into the bottom of the bin where the poultry can access it freely at the opening of the bin. The baffle 40 and associated hole is sized to allow the items to flow just enough to be available but causing the items to fill the bottom of the bin in such a ways that the items cannot overflow and spill out of the bin onto the ground. In this design, the cages 24 and the baffles 40 are removable, making it easy for the user to clean the internal compartments and then simply re-insert the cages and items after cleaning. The feed bin baffles 24 in this design (identified in other figures) serve the same purpose as described above in that they stop the flow of feed to prevent overflowing onto the ground. The baffles 24 are fixed into place in this example but could be designed to be removable similar to the grit and oyster baffles 40.

Figure 5:
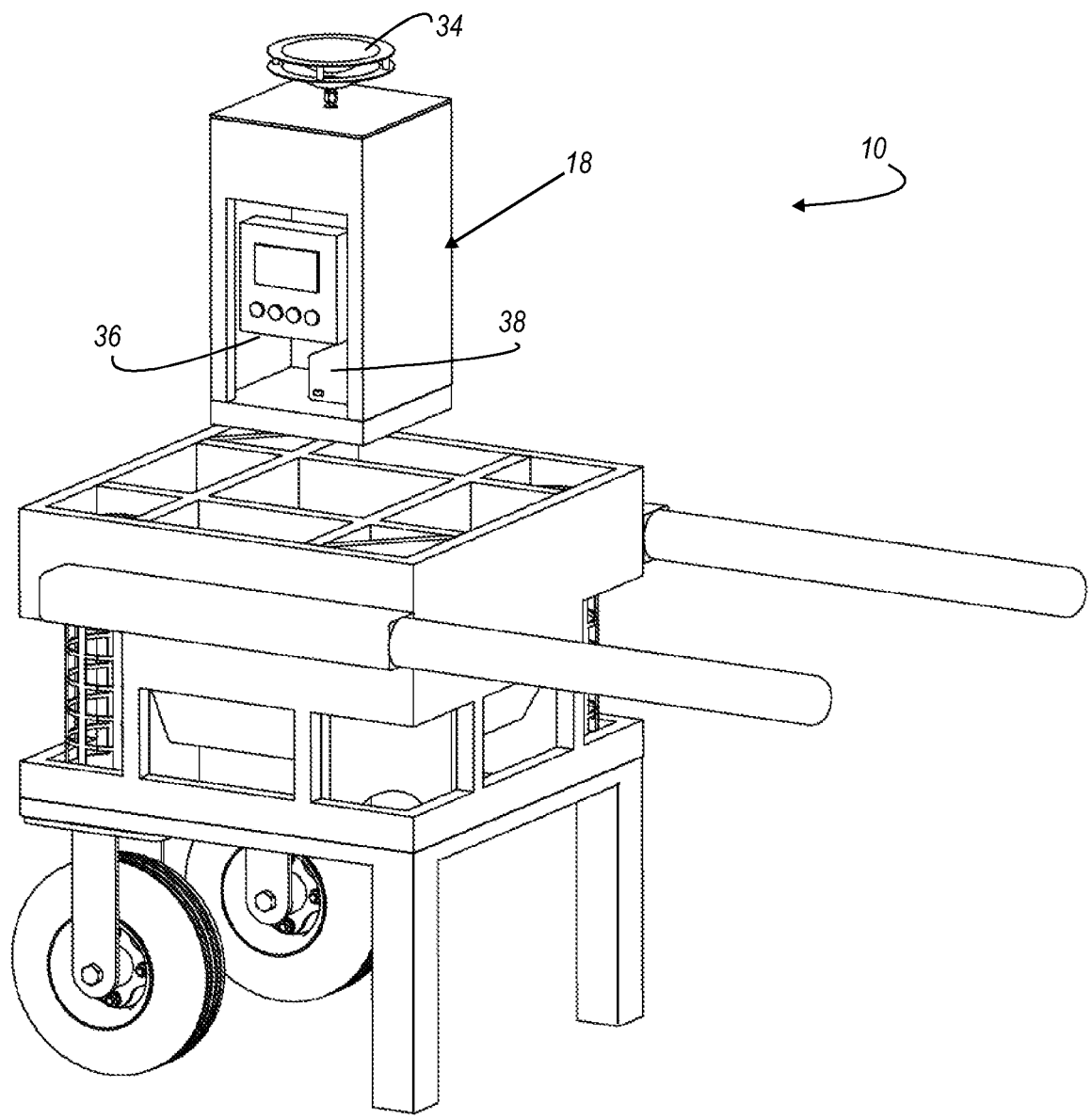
FIG. 5 is an exploded upper perspective view of one embodiment of a feeder system.

FIG. 5 is an exploded upper perspective view of one embodiment of a feeder system. This figure illustrates details of the main components in the scratch/feed spreader assembly 18. The assembly 18 could be designed various ways to perform the same function. As shown, the assembly contains the motor 32 (FIG. 10B) which is operatively coupled to the spreader plate(s) 34 for distributing the scratch or feed from the top bin or hopper 16 by slinging the scratch or feed outward onto the ground. The motor 32 is activated by a timer 36 which the user can preset to predetermined feed times, intervals and/or durations. The timer 36 and motor 32 can be powered by a battery 38 which is also shown in this figure.

Figure 6:
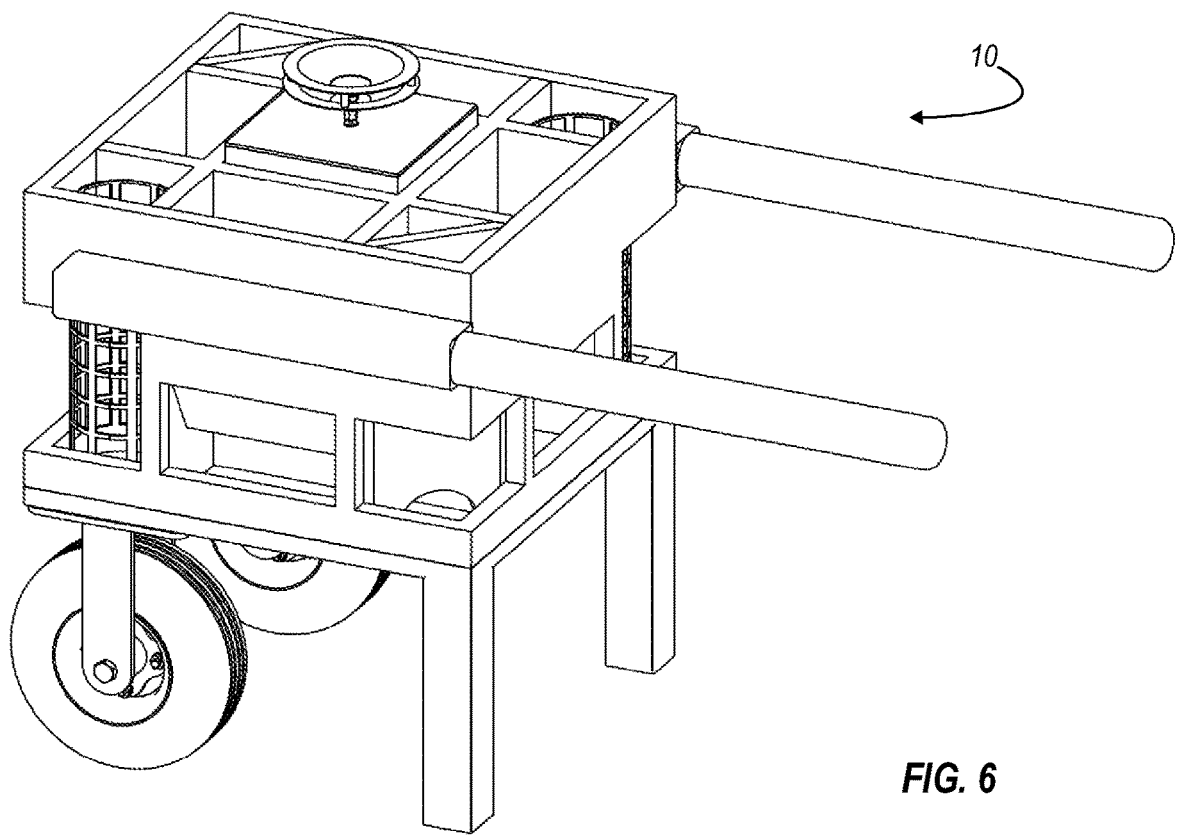
FIG. 6 is an upper perspective view of one embodiment of a feeder system.

FIG. 6 is an upper perspective view of one embodiment of a feeder system. This figure illustrates how the scratch/feed spreader assembly 18 with timer, motor, and battery is installed into place in its designated compartment 28. This device is optional so the user can decide to install it or not. For clarity, the hopper 16 and lid are not shown in FIGS. 5-7.

Figure 7:
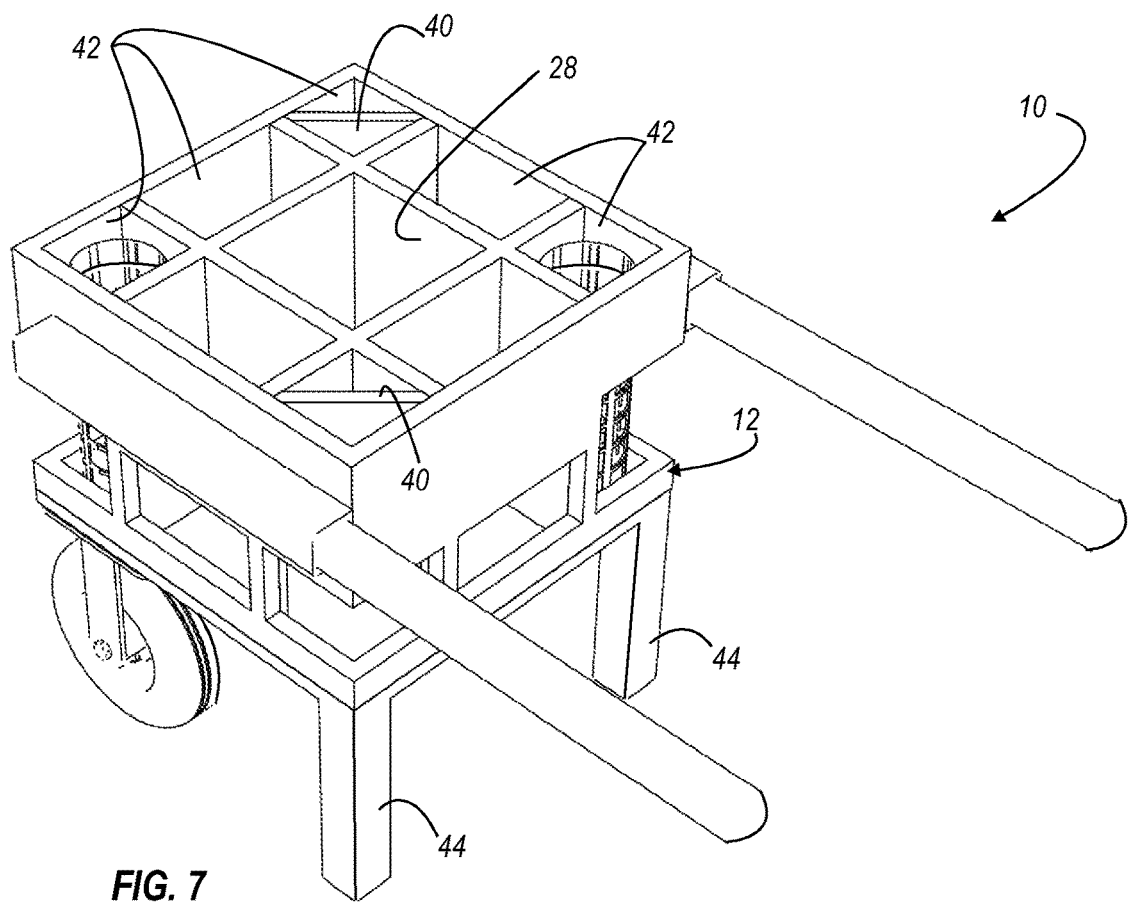
FIG. 7 is an upper perspective view of one embodiment of a feeder system.

FIG. 7 is an upper perspective view of one embodiment of a feeder system. This figure illustrates the compartments 42, 28 inside the main body of the feeder also referred to as the cart 12. These internal compartments 42, 28 serve as feed storage bins which can be used to store loose feed which is made readily available to the poultry. These bins can also be used simply for a convenient place to store spare bagged feed so the user can easily refill the feeder without having to walk to or carry feed a long distance to refill the feeder. In the latter case, the user may choose to not use all feed bins for actual feeding but instead use some of the bins to simply store extra feed or other items inside bags or appropriate containers for easy access by the user in the field. For example, a user may decide to not feed scratch but rather store spare grit or feed in this compartment which can later be poured into the appropriate bins where the poultry can access it. As shown in this figure, there are four feed bins used for feeding the poultry. They are spaced one per side of the feeder. There are two vegetable bins with cages (each one is on opposite corner from the other). There are two oyster/grit bins which are also placed on opposite corners from each other. These bins are spaced off of the ground by use of the attached wheels for the cart's mobility. Also, the rear side of the cart has two posts 44 to stabilize and level the cart when the cart is sitting at rest in the field. The lid/cover 14 serves to protect the inside of the feeder system from ingress of rain water and prevent damage to the internal components and/or feed. For additional protection seals such as weather stripping can be used to seal mating surfaces such as the surfaces where the scratch/feed hopper assembly 16 sits onto the top of the internal feed storage compartments. Also, various types of latches could be implemented to secure the removable sections such as the lid/cover to the section that it rests upon (e.g., the scratch hopper 16 rests on the surface of the cart body 12 where the internal feed storage bins are located). Latches could help prevent animals from removing the lid or knocking off the sections. Latches may also help to ensure water tight seals if used in conjunction with seals such as weather stripping or o-rings.

Figure 8:
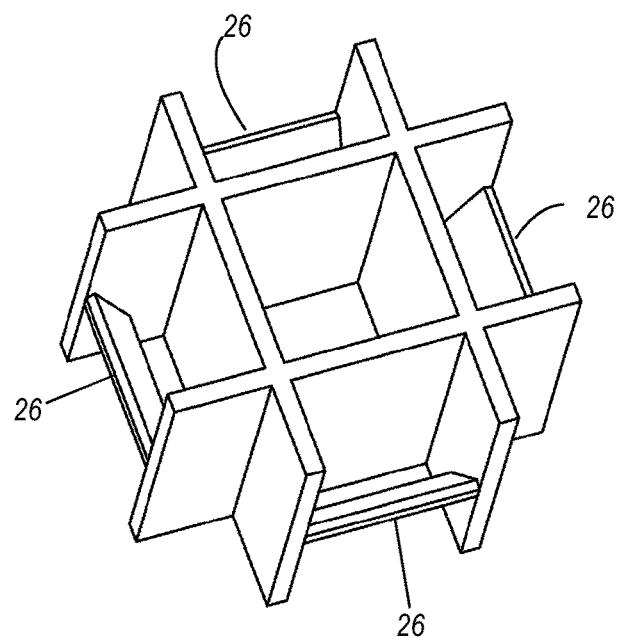
FIG. 8 is an upper perspective view of a feeder system having internal feed storage compartments and feed bin baffles.

FIG. 8 is an upper perspective view of the internal feed storage compartments and feed bin baffles 26. In this example, the compartments are built as s ingle assembly shaped like a hash tag or pound symbol. The baffles 26 for the four "layer type food" feed bins are installed into place as part of the assembly but could be made as insert-able and separate from the compartment assembly. As shown, the compartment assembly can easily be slid into the cart body 12 or removed from the cart body 12. This is a benefit of the invention because it provides easy access to clean the inside areas of the feeder system without having to clean around obstacles.

Figure 9:
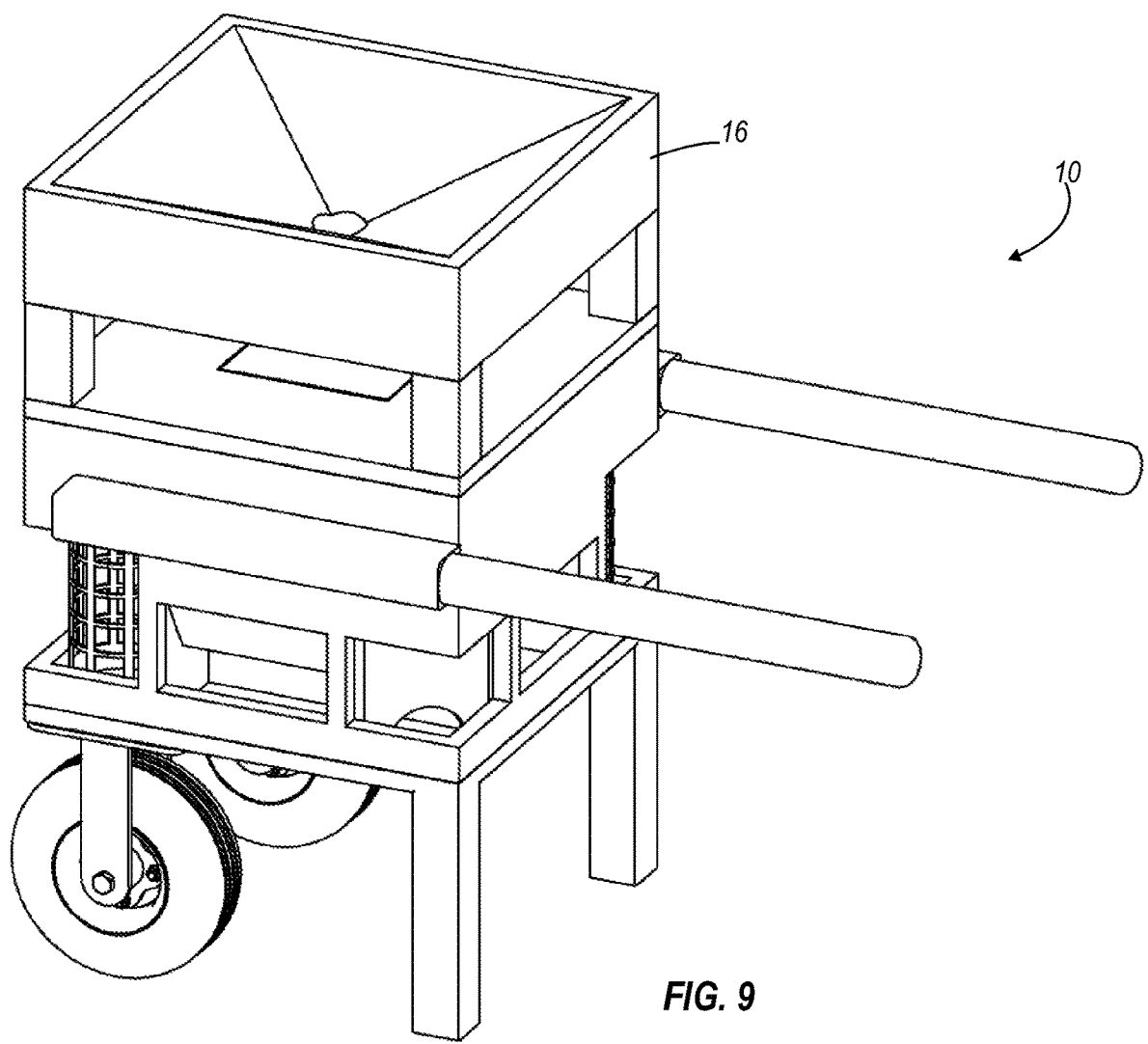
FIG. 9 is an upper perspective view of one embodiment of a feeder system.

FIG. 9 is an upper perspective view of one embodiment of a feeder system. This figure illustrates how the inside of the scratch/feeder hopper 16 can have a funnel shape to force the scratch or feed to flow down towards the funnel and spreader assembly for distribution by the motor. Without a funnel, the scratch or feed would simply sit static in the hopper and could not be distributed to the poultry.

Figure 10A:
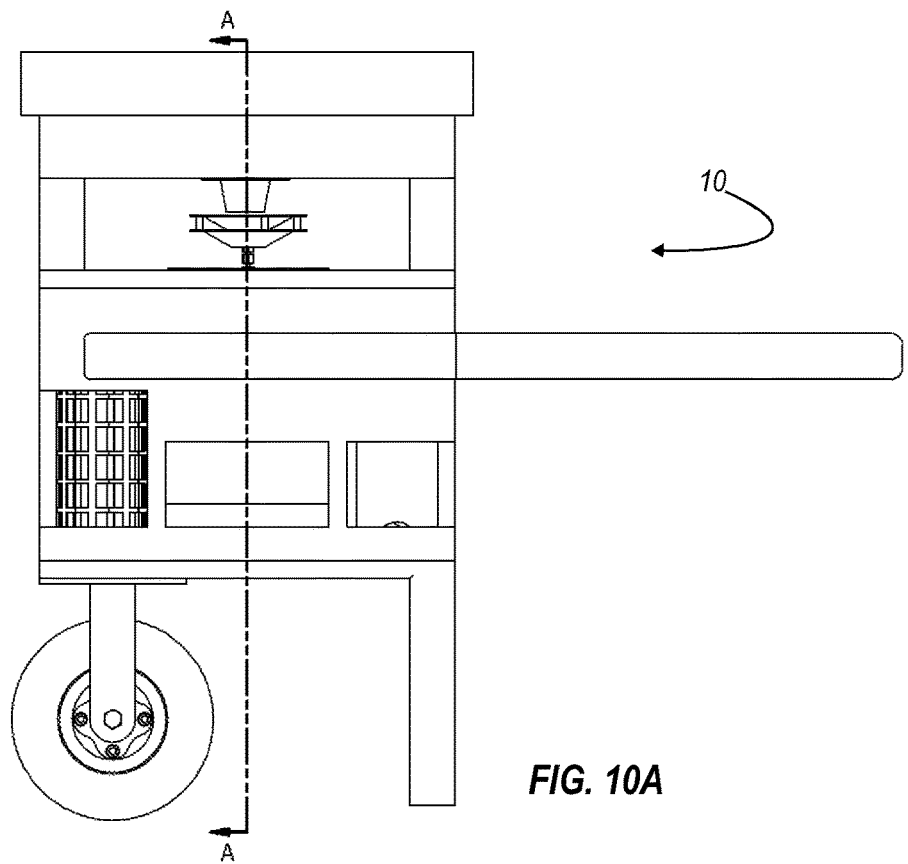
FIG. 10A is a side view of one embodiment of a feeder system.
Figure 10B:
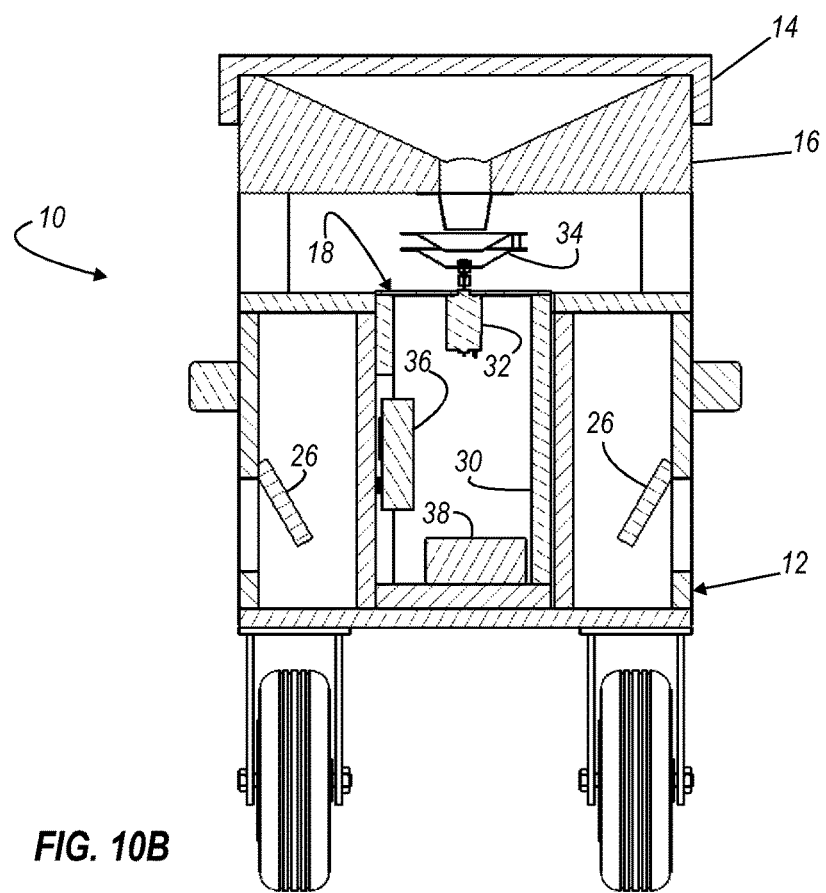
FIG. 10B is sectional view taken alone line A-A of FIG. 10A.
Figure 11A:
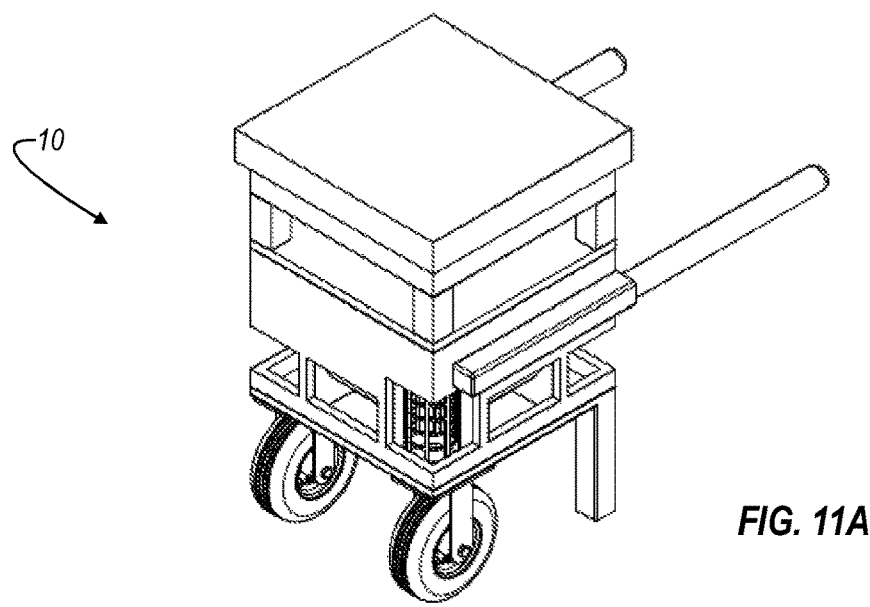
FIGS. 11A-11I are various views of embodiments of a feeder system, including isometric, side, top, and bottom views.
Figure 11B:
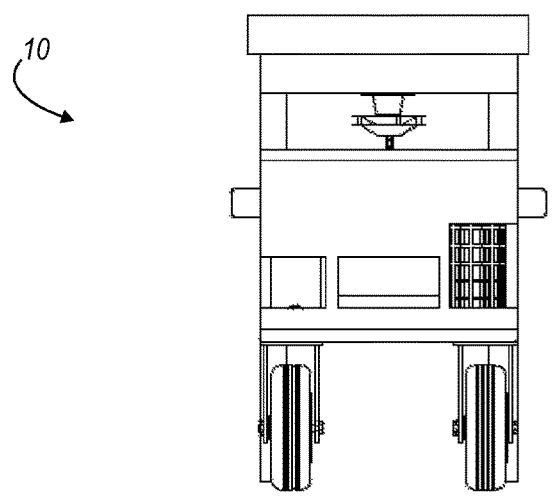
Figure 11C:
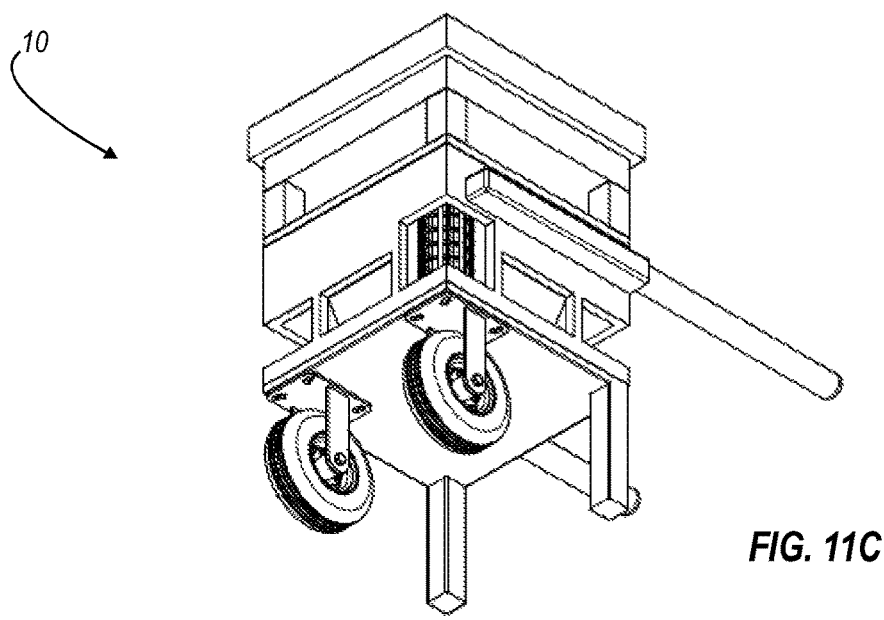
Figure 11D:
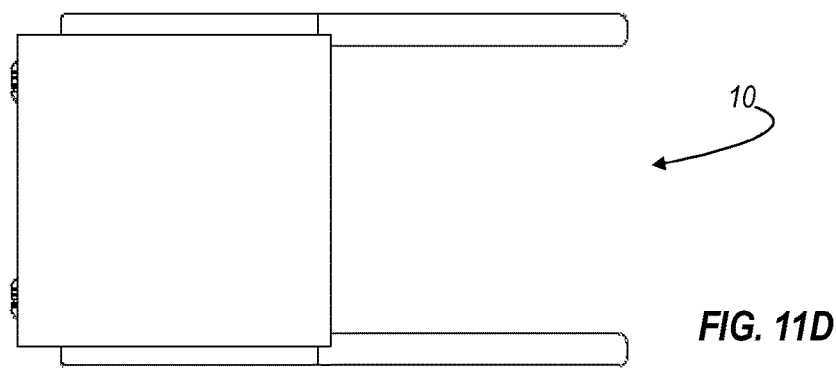
Figure 11E:
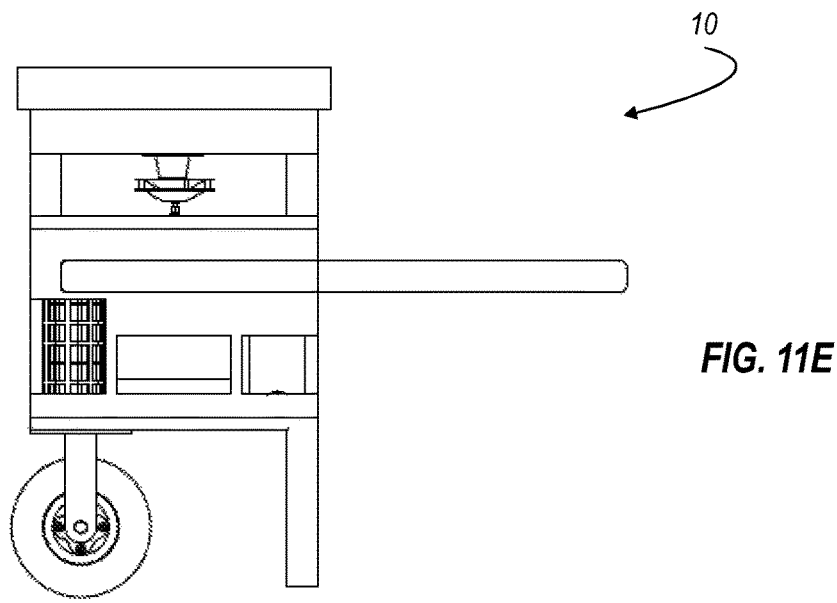
Figure 11F:
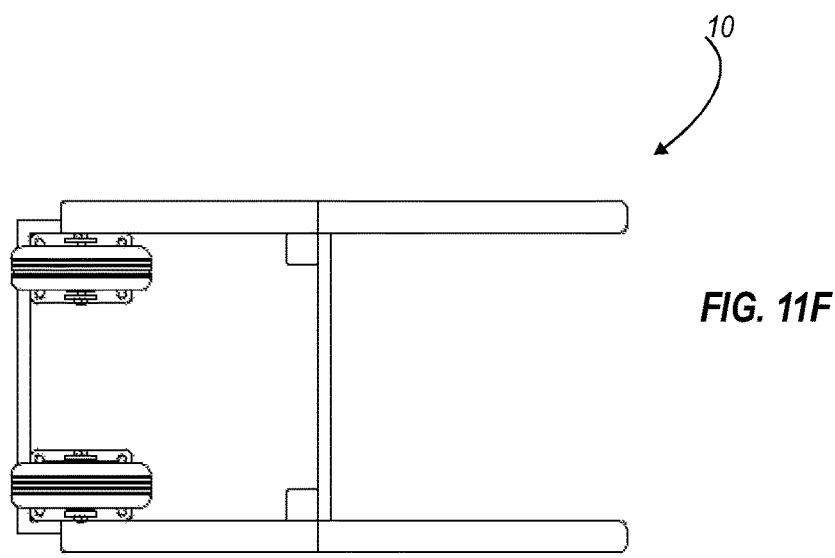
Figure 11G:
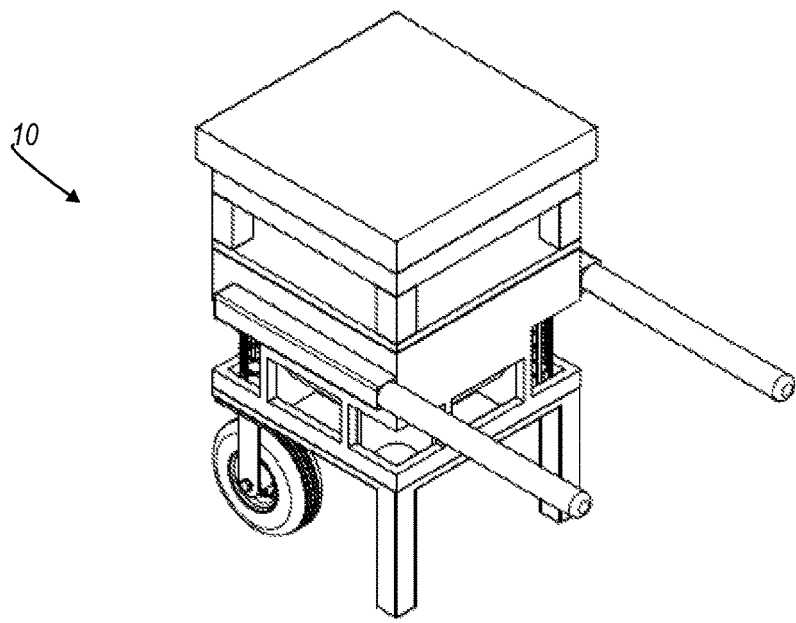
Figure 11H:
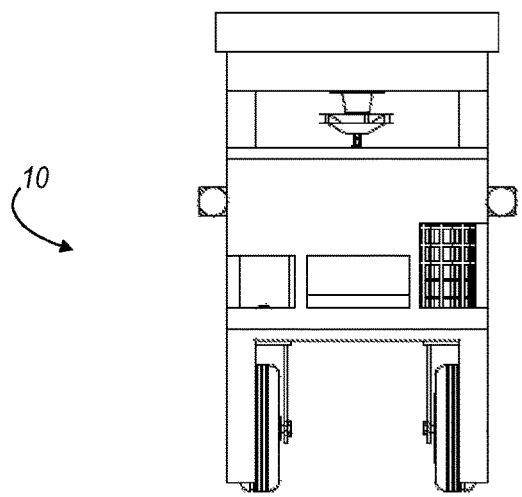
Figure 11I:
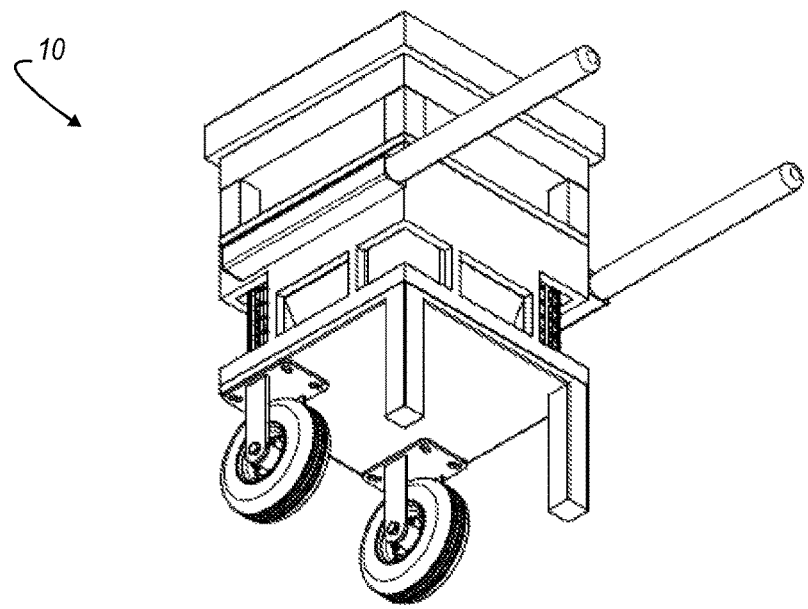

FIGS. 10A is a side view and FIG. 10B is a sectional view taken along line A-A of FIG. 10A. FIG. 10B is a section view which slices across the left to right sides of the feeder system 10. This illustrates the internal compartments and how the various feed, grit, and scratch items are distributed from within the volumes and compartments.

FIGS. 11A-11*l* are various views of one embodiment of a feeder system. These figures provide various views of the feeder system such as isometric views (11A, 11C, 11G, 11*l*), side views (11E), bottom (11F), front (11B), rear (11H), top (11D) views and others.

Note that a feeder system may use any combination of compartments configured as feed dispensing mechanisms, water dispensing mechanisms, storage areas, etc. With respect to feed dispensing mechanisms, any type of dispensing mechanism may be used, such as a mechanical dispenser/spreader (e.g., spreader assembly 18, etc.), a gravity-fed dispenser (e.g., compartments 42 with baffles 26; compartments 42 with cages 24; etc.), or any other desired mechanism.

Figure 12:
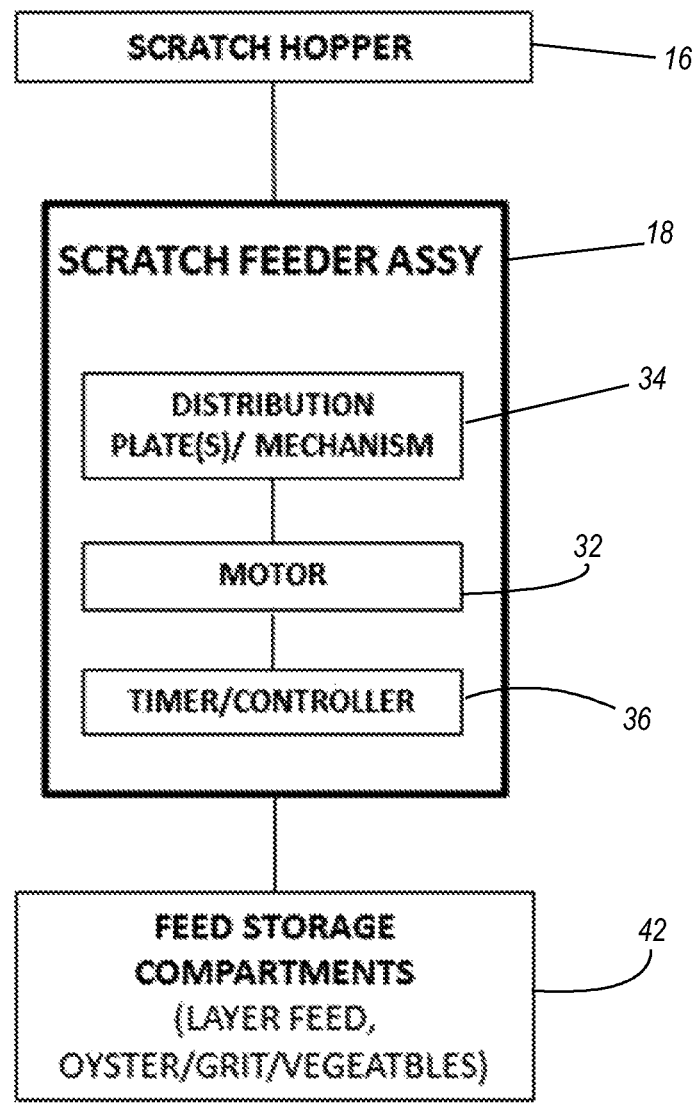
FIG. 12 is a block diagram illustrating one embodiment of the overall operation of a feeder system.

FIG. 12 is a block diagram illustrating the overall operation of one embodiment of a feeder system. This figure illustrates the overall function of the feeder system including the optional scratch hopper 16 and spreader assemblies 18. In this configuration, the internal feed compartments 42 (inside the cart body) can be used for gravity feed of normal feed, grit, or vegetables as examples. This can be done in conjunction with the scratch feeder assemblies 18 which are used to distribute scratch or feed in a wider distributed pattern around the feeder system at specific times and durations. This illustrates the flexibility of this feeder system in that it can be configured in different ways to perform various functions of feed, various types of distribution means, and the ability to scale how much feed the user may want to offer (either use more bins to offer more food for larger flocks or use fewer bins to scale back the amount of available food for smaller flocks). It is also flexible in that the internal unused bins can be used as convenient storage for spare feed, making refilling the bins easier and more convenient while operating the system in the field.

Figure 13:
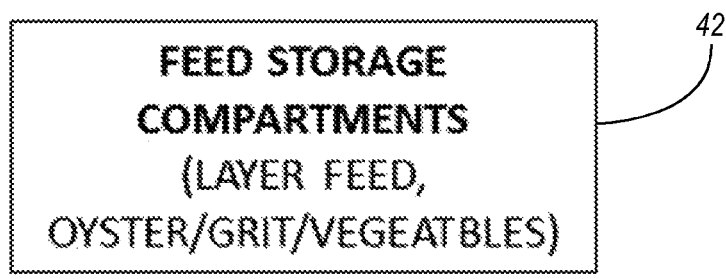
FIG. 13 is a block diagram illustrating one embodiment of the overall operation of a feeder system.

FIG. 13 is a block diagram illustrating the overall operation of one embodiment of a feeder system. This figure illustrates the feeder system in a simple example configuration for where the scratch hopper and spreader assemblies are not used. In this case, only the gravity feed compartments (gravity feed dispensing mechanisms) and bins are used to supply "at will" access of feed to the poultry. The lid/cover in this configuration would simply be placed over the top of the cart to cover the compartments (for example, see FIG. 2). The lid/cover is universal in this way as it can be used either to cover the top of the scratch hopper (when the scratch assemblies are installed) or when removing the scratch assemblies, the lid can simply be used to cover the cart top to protect the compartments.

Figure 14:
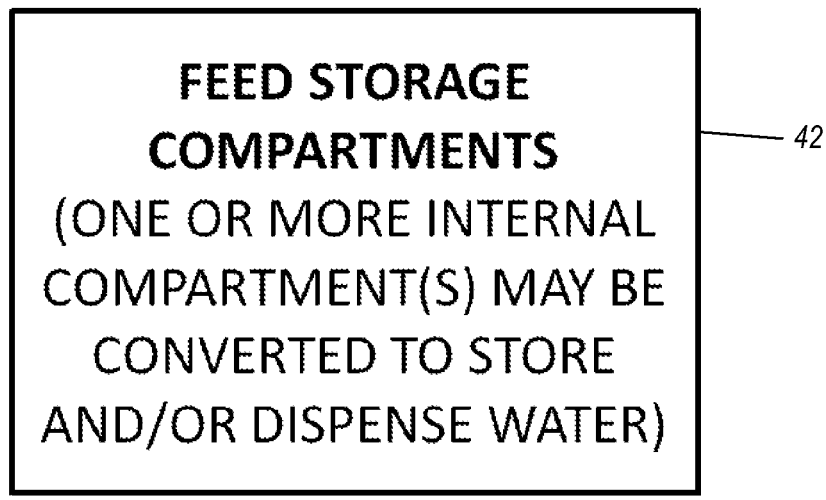
FIGS. 14-17 are block diagrams illustrating embodiments of a feeder system that stores and/or dispenses water.

FIG. 14 is a block diagram that illustrates a basic feeder system where compartment(s) may be used to store and/or dispense water. Even though the illustration shows a basic feeder, the optional scratch feeder assembly could also be incorporated along with the water storage and dispensing features.

Figure 15:
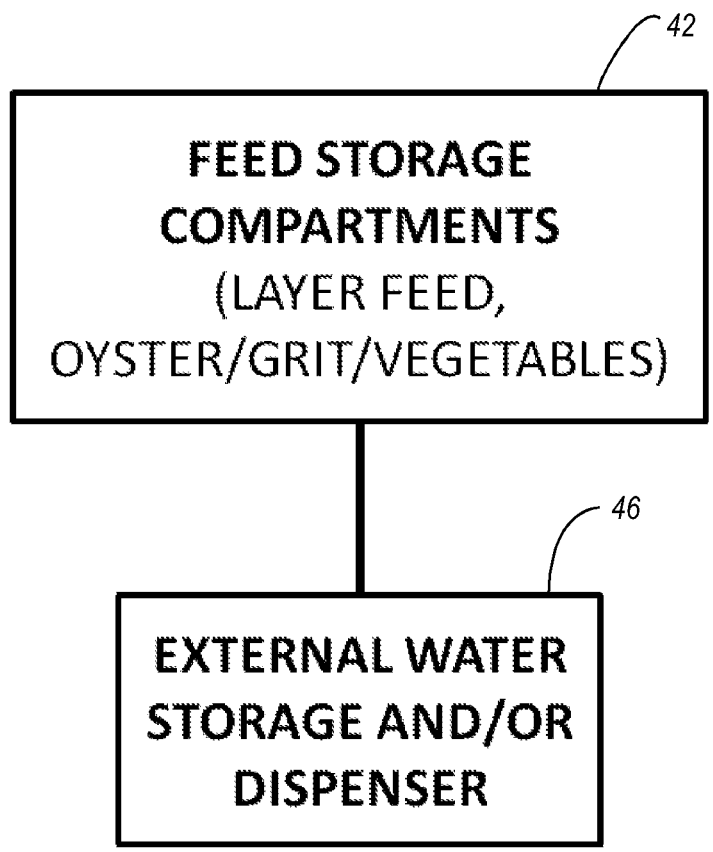

FIG. 15 is a block diagram that illustrates a basic feeder system where compartment(s) are used for feed and other essentials but water storage and/or dispensing is incorporated externally (dispenser 46). Even though the illustration shows a basic feeder, the optional scratch feeder assembly could also be incorporated along with the water storage and dispensing features.

Figure 16:
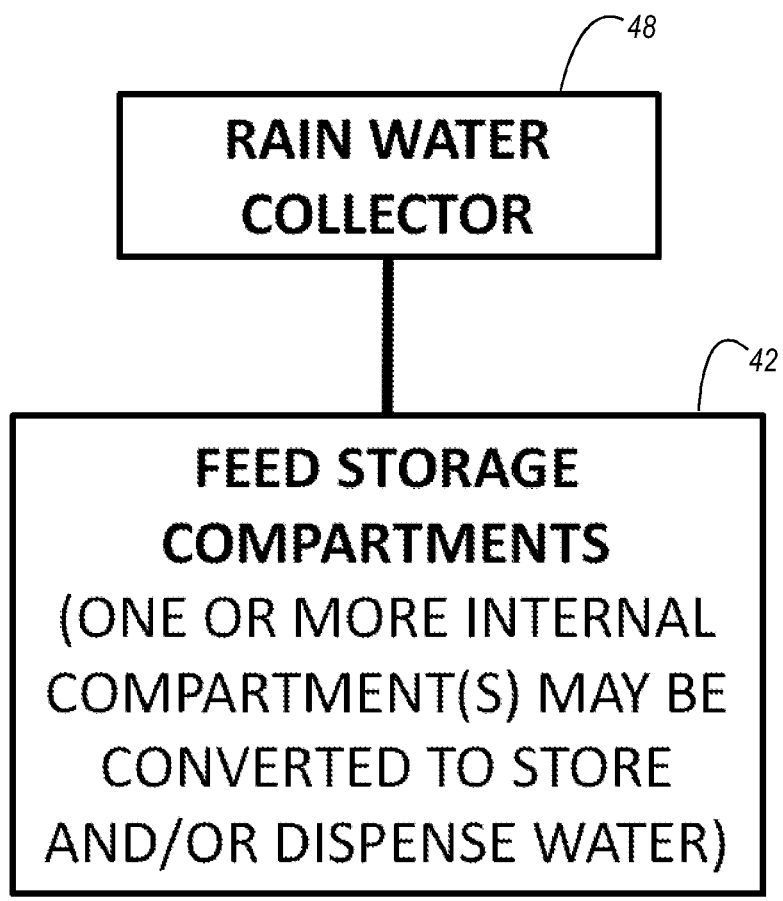

FIG. 16 is a block diagram that illustrates a feeder system having a rain water collection system 48 added to the feeder and one or more of the internal compartments are configured to store and/or dispense the water. Even though the illustration shows a basic feeder, the optional scratch feeder assembly could also be incorporated along with the water storage and dispensing features.

Figure 17:
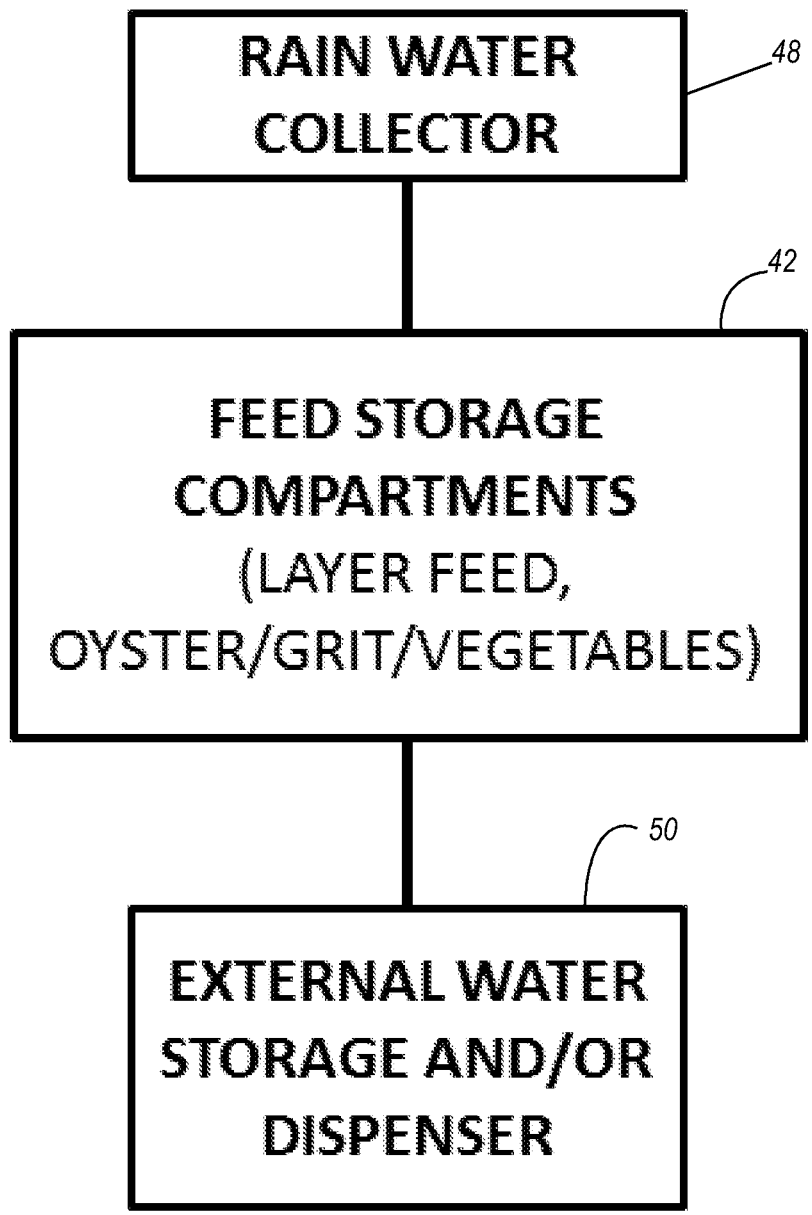

FIG. 17 is a block diagram that illustrates a feeder system having a rain water collection system 48 added to the feeder but internal compartments are configured for storage and dispensing (non-water) essentials. The collected water is stored and/or dispensed externally (block 50). Even though the illustration shows a basic feeder, the optional scratch feeder assembly could also be incorporated along with the water storage and dispensing features.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

The invention claimed is:

1. A portable poultry feeder system for storing and dispensing food,
the poultry feeder system comprising:
a feeder system body;
one or more wheels coupled to the feeder system body;
one or more handles extending from the feeder system body, such that a user can grasp and manipulate the handles to cause the pair of wheels to support the weight of the portable poultry feeder system;
a plurality of compartments, wherein the plurality of compartments are each configured to store one or more types of poultry food;
a motorized mechanical spreader in communication with one of the plurality of compartments to dispense poultry food over an area at predetermined times; and
a gravity-fed dispenser in communication with one of the plurality of compartments to dispense poultry food stored in the respective compartment.

2. The poultry feeder system of claim 1, wherein the poultry feeder system is configured to allow poultry to feed at will.

3. The poultry feeder system of claim 1, wherein the one or more compartments are configurable by a user to store and dispense various types of feed.

4. The poultry feeder system of claim 1, further comprising a rain water collection system to collect and make water available for dispensing to the poultry.

5. The poultry feeder system of claim 4, wherein the rain water collection system is configured to dispense water to the poultry, enabling the poultry to drink at will.

6. The poultry feeder system of claim 1, wherein the motorized mechanical spreader and corresponding compartment comprise a removable scratch feeder.

7. The poultry feeder system of claim 6, wherein the removable scratch feeder further comprises an electronic timer electrically connected to the motorized mechanical spreader for spreading scratch at predetermined times and intervals.

8. A portable poultry feeder system for storing and dispensing food,
the poultry feeder system comprising:
a cart;
one or more wheels coupled to the cart;
one or more handles coupled to the cart for allowing a user to move the cart by grasping the one or more handles and rolling the cart on the one or more wheels, wherein the one or more handles are arranged relative to the wheels such that by grasping and manipulating the one or more handles, the cart is supported by the one or more wheels to be easily movable;
a plurality of reconfigurable compartments, wherein the plurality of reconfigurable compartments are each configured to store one or more types of poultry food;
a gravity-fed dispenser in communication with a first reconfigurable compartment to dispense poultry food stored in the first reconfigurable compartment; and a mechanical spreader in communication with a second reconfigurable compartment to dispense poultry food stored in the second reconfigurable compartment, the mechanical spreader comprising a rotating plate assembly configured to spread poultry feed in an area when the plate assembly is rotated.

9. The poultry feeder system of claim 8, wherein the poultry feeder system is configured to allow poultry to feed at will.

10. The poultry feeder system of claim 8, wherein the one or more reconfigurable compartments are configurable by a user to store and dispense various types of feed.

11. The poultry feeder system of claim 8, further comprising a rain water collection system to collect and make water available for dispensing to the poultry.

12. The poultry feeder system of claim 8, wherein the rain water collection system is configured to dispense water to the poultry, enabling the poultry to drink at will.

13. The poultry feeder system of claim 8, wherein the mechanical spreader and the second reconfigurable compartment comprise a removable scratch feeder.

14. The poultry feeder system of claim 13, wherein the removable scratch feeder further comprises a motorized spreader for spreading scratch at predetermined times and intervals.

15. A method of storing and dispensing poultry food, the method comprising:
   providing a cart;
   providing one or more wheels coupled to the cart;
   providing one or more handles coupled to the cart, the one or more handles being arranged relative to the one or more wheels such that the one or more wheels support the weight of the cart when the handles are grasped and manipulated by a user;
   moving the cart to a desired location by grasping and displacing the one or more handles and rolling the cart on the one or more wheels;
   providing a plurality of reconfigurable compartments on the cart;
   configuring at least some of the compartments to each store one or more types of poultry food;
   providing a gravity-fed dispenser in communication with one of the reconfigurable compartments to dispense poultry food stored in the corresponding reconfigurable compartment;
   providing a mechanical scratch spreader in communication with one of the reconfigurable compartments to dispense poultry food stored in the corresponding reconfigurable compartment, the mechanical spreader comprising an electronically controlled rotating plate assembly configured to spread scratch in an area at predetermined times; and
   dispensing food stored in the plurality of the compartments using the gravity-fed dispenser and the mechanical scratch spreader.

16. The method of claim 15, further comprising configuring the gravity-fed dispenser to allow poultry to feed at will.

17. The method of claim 15, wherein the plurality of reconfigurable compartments are configurable by a user to store and dispense various types of feed.

18. The method of claim 15, further comprising:
   providing a rain water collection system; collecting rain water in the water collection system; and
   dispensing the collected rain water to the poultry.

19. The method of claim 15, wherein the mechanical scratch spreader is removable from the cart.

20. The method of claim 15, further comprising spreading scratch at predetermined times and intervals.

* * * * *